(12) United States Patent
Kim

(10) Patent No.: US 7,702,096 B2
(45) Date of Patent: Apr. 20, 2010

(54) SELF-CRADLING TYPE PORTABLE TERMINAL

(75) Inventor: Young S. Kim, Los Altos, CA (US)

(73) Assignee: Samsung Electronics Co., Ltd (KR)

( * ) Notice: Subject to any disclaimer, the term of this patent is extended or adjusted under 35 U.S.C. 154(b) by 554 days.

(21) Appl. No.: 11/699,204

(22) Filed: Jan. 29, 2007

(65) Prior Publication Data

US 2007/0218723 A1    Sep. 20, 2007

(30) Foreign Application Priority Data

Jan. 27, 2006    (KR) .................. 10-2006-0009049

(51) Int. Cl.
*H04M 1/00*    (2006.01)
*H04M 9/00*    (2006.01)

(52) U.S. Cl. ..................... 379/433.12; 379/428.01; 455/575.4

(58) Field of Classification Search ............ 379/433.11, 379/433.12, 433.13, 428.01; 455/90.3, 575.3, 455/575.4
See application file for complete search history.

(56) References Cited

U.S. PATENT DOCUMENTS

| 2003/0080491 | A1 | 5/2003 | Guaraldi et al. |
| 2005/0090296 | A1 | 4/2005 | Gordecki |
| 2005/0277439 | A1 | 12/2005 | Brelo et al. |

FOREIGN PATENT DOCUMENTS

| CN | 1638403 | 7/2005 |
| EP | 0 731 589 | 9/1996 |
| EP | 1 549 029 | 6/2005 |

*Primary Examiner*—Tuan D Nguyen
(74) *Attorney, Agent, or Firm*—The Farrell Law Firm, LLP

(57) ABSTRACT

Disclosed is a self-cradling type portable terminal including a first body having at least one first user interfacing unit, the first body having a stationary body and a sliding body adapted to slide in a longitudinal direction of the stationary body while continuously facing the stationary body so that a predetermined region of an upper surface of the stationary body is exposed/hidden, and a second body having at least one second user interfacing unit, the second body being connected to the first body so as to rotate about a hinge axis extending through a region of a lateral surface of the first body in a longitudinal direction of the first body, the region being spaced from a center of the lateral surface, so that the first body is supported at a slant by the second body when the second body is rotated by a predetermined angle relative to the first body.

16 Claims, 4 Drawing Sheets

SELF-CRADLING TYPE PORTABLE TERMINAL

PRIORITY

This application claims priority under 35 U.S.C. §119 to an application entitled "Self-Cradling Type Portable Terminal" filed with the Korean Intellectual Property Office on Jan. 27, 2006 and assigned Serial No. 2006-9049, the contents of which are incorporated herein by reference.

BACKGROUND OF THE INVENTION

1. Field of the Invention

The present invention relates generally to a portable terminal, including a digital multimedia broadcasting (DMB) phone, a game phone, a chatting phone, a camera phone, an MP3 phone, a cellular phone, a Personal Communication System (PCS), a Personal Digital Assistant (PDA), and a Hand Held Phone (HHP), and in particular, to a self-cradling type portable terminal adapted to be used conveniently in a DMB mode or camera mode.

2. Description of the Related Art

In general, "portable terminal" refers to an electronic apparatus that a user can carry to perform wireless communication with a desired partner. As a means of further facilitating portability, designs of such portable terminals are increasingly more compact, slim, and light, and are also increasingly providing multimedia services, having a much wider variety of functions. In particular, future portable terminals are expected to incorporate greater multi-functionality and be capable of multi-purpose utilization, as well as to be more compact, light, and capable of being modified to be suitable for various multimedia or Internet environments.

Conventional portable terminals may be classified into various categories according to their appearance, such as bar-type portable terminals, flip-type portable terminals, and folder-type portable terminals. The bar-type portable terminals have a single housing shaped like a bar. The flip-type portable terminals have a flip rotatably coupled to a bar-shaped housing by a hinge device. The folder-type portable terminals have a folder connected to a single bar-shaped housing by a hinge device in such a manner that the folder can be rotated to fold on or unfold from the housing.

Portable terminals may also be classified into neck wearable type portable terminals and wrist wearable type portable terminals according to the position or way in which users put on the portable terminals. The neck wearable type portable terminals are worn around the user's neck using a string, and the wrist wearable type portable terminals are worn around the user's wrist.

In addition, portable terminals may be classified into rotation-type portable terminals and sliding-type portable terminals. In the rotation-type portable terminals, two housings are coupled to each other in such a manner that one housing rotates to be opened or closed relative to the other while they face each other. In the sliding-type portable terminals, two housings are coupled to each other in such a manner that one housing slides along a longitudinal direction to be opened or closed relative to the other housing. These variously classified portable terminals can be easily understood by those skilled in the art.

Meanwhile, conventional portable terminals now tend to transmit data at a much higher speed in addition to providing a basic voice communication function. In other words, according to increased consumer demands, recent portable terminals tend to provide services using a wireless communication technology capable of transmitting data at a much higher speed.

Recent portable terminals also tend to be equipped with a camera lens to obtain video signals for transmission. Current portable terminals have an external or embedded camera lens module, which enables a user to perform video communication with a desired partner or to photograph desired objects. However, when a conventional portable terminal is to be cradled at a slant, a separate cradle is necessary. This is an additional economic burden on the user.

Particularly, in a DMB mode for watching various mobile images, the display device must be cradled at a slant and stereoscopic sound must be provided for realistic watching. However, it is inconvenient to cradle a conventional portable terminal even when a separate cradle is used.

Furthermore, conventional portable terminals have a camera lens module fixed in a predetermined position on their body. This means that it is inconvenient to use them in a camera mode for photographing mobile images or in a self-shot mode. Therefore, it is requested to provide a portable terminal having a self-cradling function so that the camera lens can rotate for convenient use.

SUMMARY OF THE INVENTION

Accordingly, the present invention has been made to solve the above-mentioned problems occurring in the conventional art, and an object of the present invention is to provide a portable terminal having a self-cradling function so that a user or manufacturer has economic merit.

Another object of the present invention is to provide a portable terminal adapted to be cradled easily.

Another object of the present invention is to provide a portable terminal adapted to be used conveniently in a DMB mode or camera mode.

Another object of the present invention is to provide a portable terminal adapted not only to be cradled, but also to be conveniently slidably opened/closed.

Another object of the present invention is to provide a portable terminal having a body, which is still slim even when a high-capacity camera module is mounted thereon.

Another object of the present invention is to provide a portable terminal having a camera module rotatably positioned on a second body and a camera lens positioned on an upper, lateral, or lower surface of a first body, i.e. in front of or behind a user, so that the portable terminal can be used conveniently in a camera mode for taking still or motion pictures of a desired object or in a video communication mode.

Another object of the present invention is to provide a portable terminal having a body combining a cradling function with a photographing function.

In order to accomplish these objects, there is provided a self-cradling type portable terminal including a first body having at least one first user interfacing unit, the first body having a stationary body and a sliding body adapted to slide in a longitudinal direction of the stationary body while continuously facing the stationary body so that a predetermined region of an upper surface of the stationary body is exposed/hidden, and a second body having at least one second user interfacing unit, the second body being connected to the first body so as to rotate about a hinge axis extending through a region of a lateral surface of the first body in a longitudinal direction of the first body, the region being spaced from a center of the lateral surface, so that the first body is supported at a slant by the second body when the second body is rotated by a predetermined angle relative to the first body.

In accordance with another aspect of the present invention, there is provided a self-cradling type portable terminal including a first body having at least one first user interfacing unit and a second body having at least one second user interfacing unit, the second body being connected to the first body so as to rotate about a hinge axis extending through a region of a lateral surface of the first body in a longitudinal direction of the first body, the region being spaced from a center of the lateral surface, so that the first body is supported at a slant by the second body when the second body is rotated by a predetermined angle relative to the first body.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Figure 1:
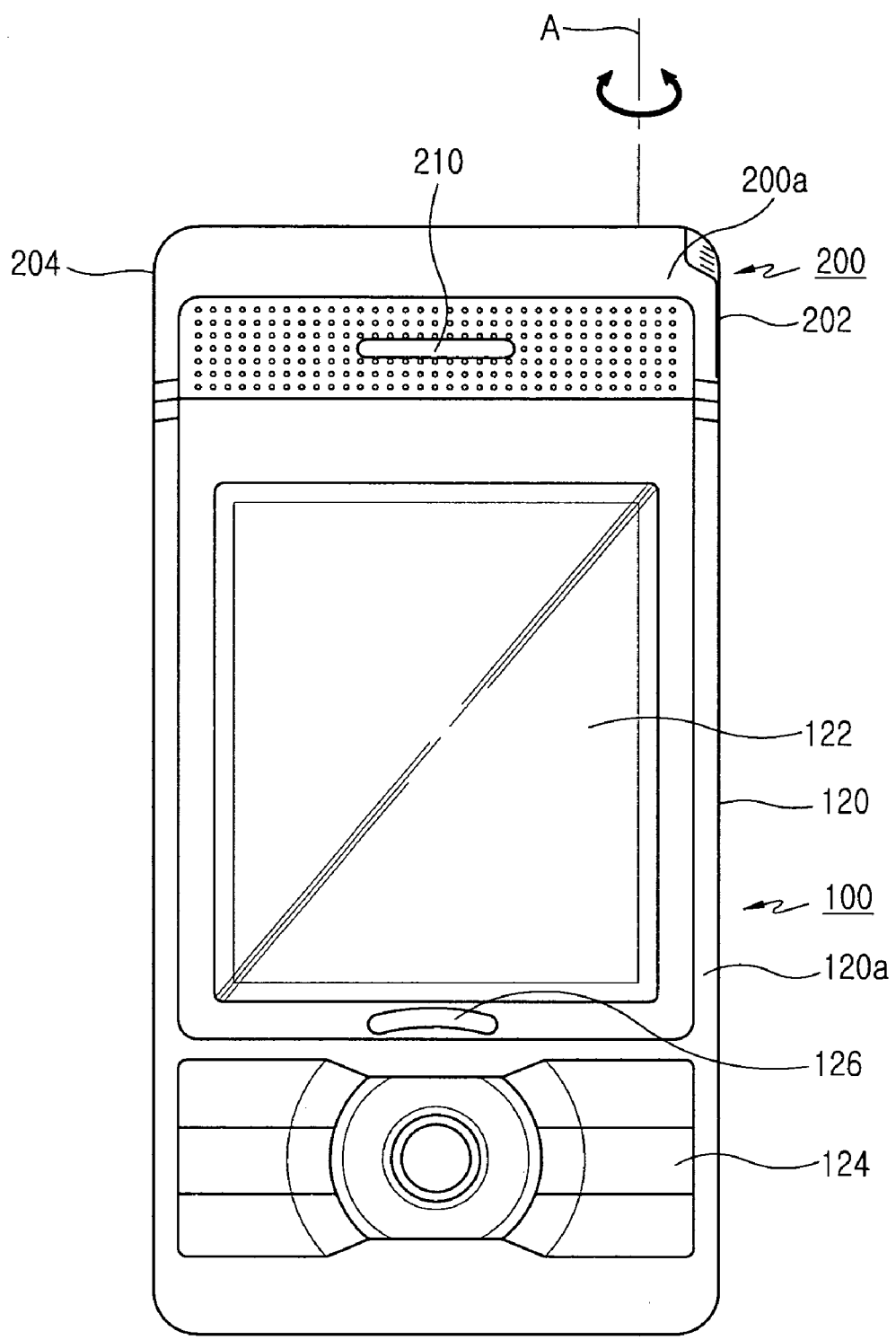
FIG. 1 is a perspective view showing a portable terminal according to the present invention.

Hereinafter, a preferred embodiment of the present invention will be described with reference to the accompanying drawings. In the following description of the present invention, a detailed description of known functions and configurations incorporated herein is omitted to avoid making the subject matter of the present invention unclear.

Referring to FIGS. 1 to 4, a portable terminal according to the present invention includes a first body 100 and a second body 200 adapted to rotate away from the first body 100 and cradle it at a slant. The first body 100 includes a stationary body 110 and a sliding body 120 adapted to slide in the longitudinal direction of the stationary body 110 while continuously facing it and expose/hide a predetermined region of an upper surface 110a of the stationary body 100. The second body 200 is connected to the first body 100 so as to rotate about a hinge axis A extending through a region of a lateral surface 120c of the first body 100 (shown in FIG. 4), which is spaced from the center of the lateral surface 120c, in the longitudinal direction of the first body 100 and, after being rotated by a predetermined angle relative to the first body 100, supports the first body 100 at a slant. More particularly, the second body 200 is connected to the sliding body 120 so as to rotate about a hinge axis A extending through a region of a lateral surface 120c of the sliding body 120, which is spaced from the center of the lateral surface 120c, in the longitudinal direction of the sliding body 120 and, after being rotated by a predetermined angle relative to the sliding body 120, supports the sliding body 120 at a slant.

The second body 200 is adapted to rotate towards or away from the sliding body 120 while continuously facing the lateral surface 120c of the sliding body 120. The second body 200 extends in a direction perpendicular to the longitudinal direction of the sliding body 120 so as to be coupled to the sliding body 120. A sliding open/closing module (not shown) is mounted between the stationary body 110 and the sliding body 120, and a hinge module (not shown) is mounted between the first body 100, particularly the sliding body 120, and the second body 200. The sliding and hinge modules can have an automatic, semi-automatic, or manual driving source. Depending on the type of the hinge module, the degree of slant of the first body 100 is adjusted. When the hinge module has an automatic or semi-automatic driving source, it has retaining ability as shown in FIG. 4.

Figure 4:
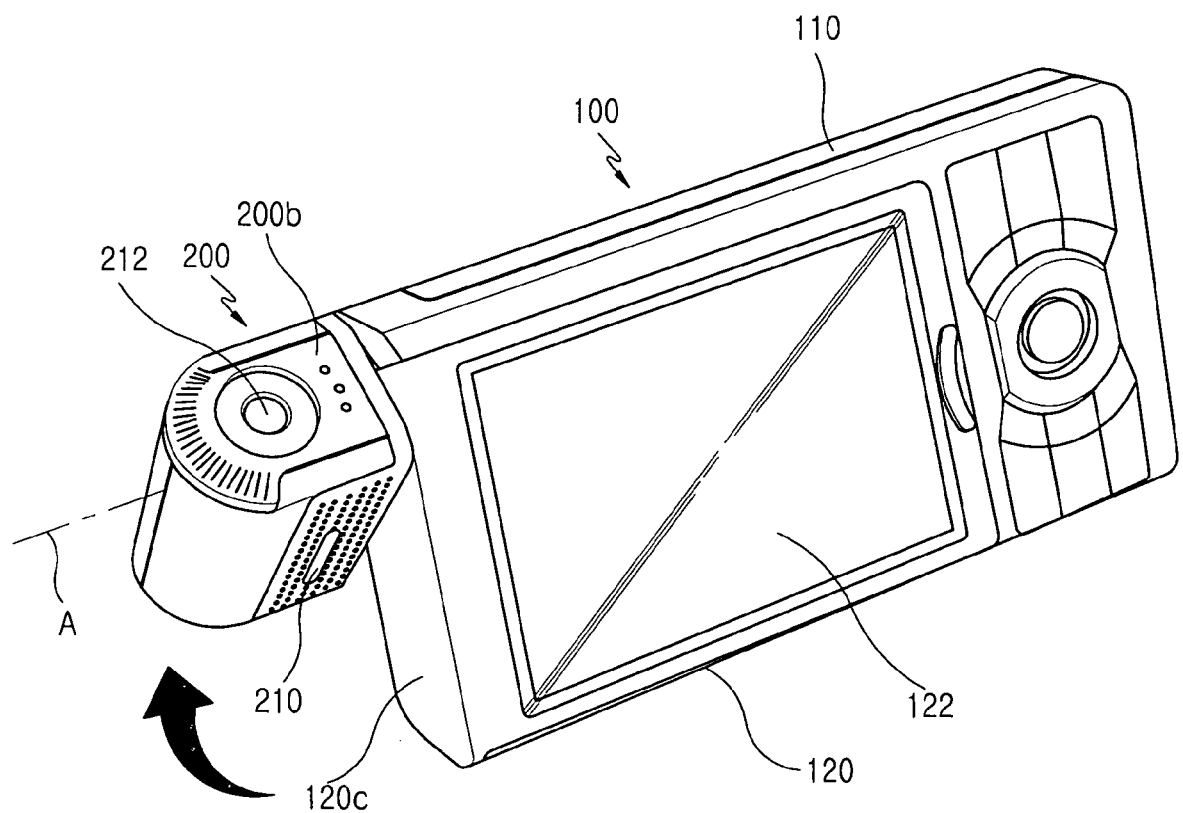
FIG. 4 is a perspective view showing a portable terminal according to the present invention, when its second body has been rotated.

Referring to FIG. 4, the second body 200 has been rotated by a predetermined angle relative to the lateral surface 120c of the sliding body 120 and supports the sliding body 120 at a slant. In this state, a free end 204 of the second body 200 abuts the ground so that the sliding body 120 is supported at a slant. The free end 204 of the second body 200 has the largest radius of rotation about the hinge axis A, while the other end 202 of the second body 200 has the smallest radius of rotation about the hinge axis A. When the second body 200 has been rotated about the hinge axis A by a predetermined angle, not only the first body 100 is supported at a slant, but also a camera lens 212 (shown in FIG. 4) is directed towards the user, as will be described later in more detail.

Figure 2:
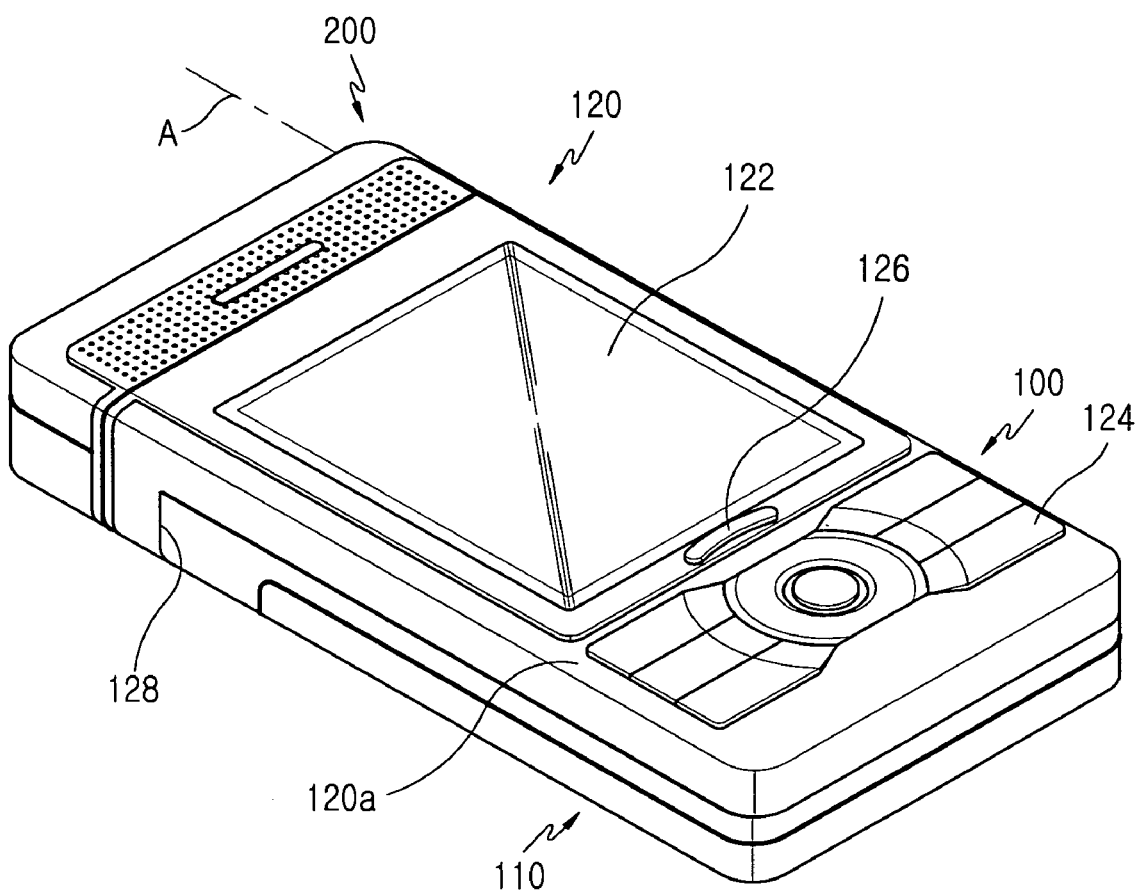
FIG. 2 is a front view of the portable terminal shown in FIG. 1.
Figure 3:
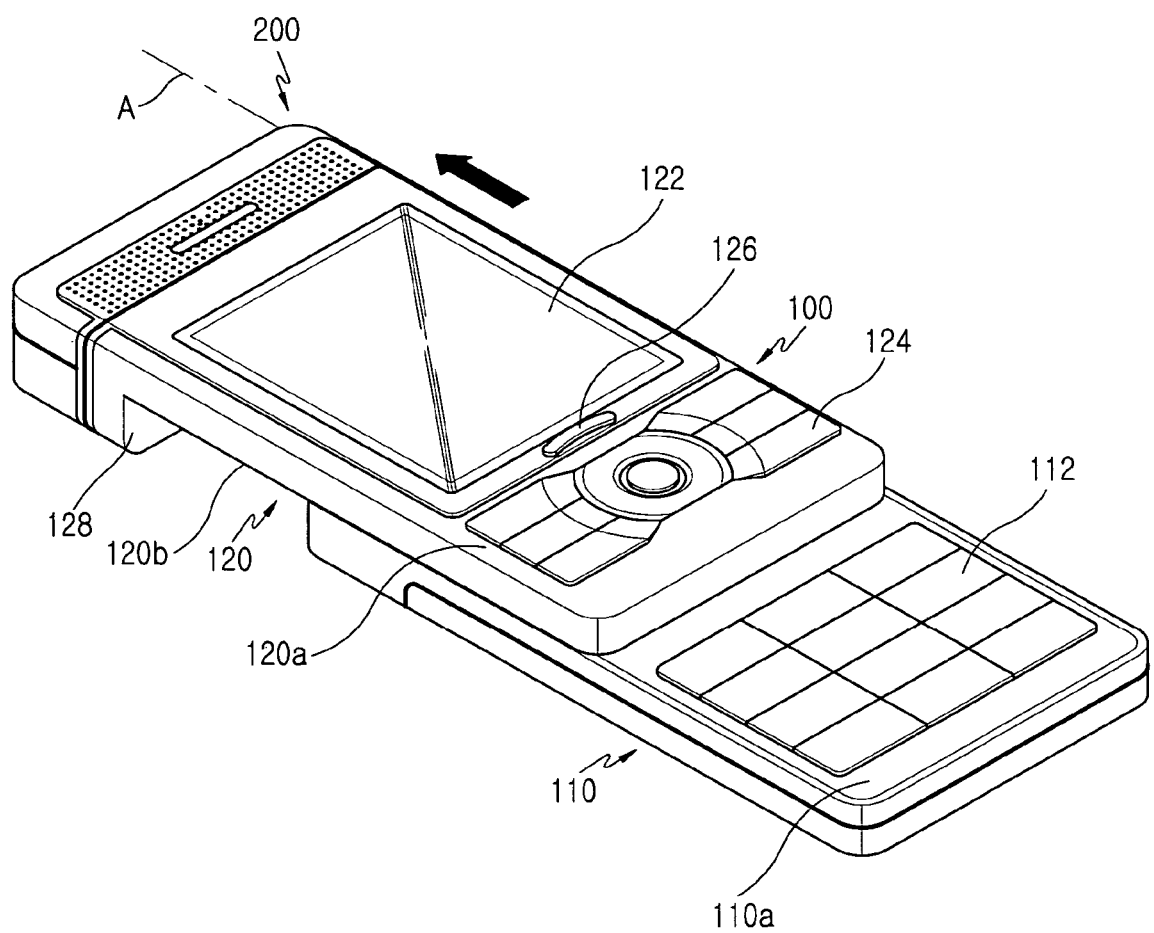
FIG. 3 is a perspective view showing a portable terminal according to the present invention, when its sliding body has been slid.

Referring to FIGS. 2 and 3, the hinge axis A of the second body 200 is parallel to a direction of sliding of the sliding body 120. Particularly, the longitudinal direction of the stationary body 110 and the sliding body 120 is parallel to the hinge axis A, while the longitudinal direction of the second body 200 is perpendicular to the longitudinal direction of the stationary body 110 and the sliding body 120, as well as to the hinge axis A. The sliding body 120 has a stepped portion 128 formed on its bottom surface 120b (shown in FIG. 2). When the sliding body 120 slides, the stepped portion 128 is moved towards or away from the stationary body 110.

The first body 100 has at least one first user interfacing unit, and the second body 200 has at least one second user interfacing unit. The first user interfacing unit includes a display device 122 positioned on an upper surface 120a of the sliding body 120, a first keypad 124 having a number of keys positioned on the upper surface 120a of the sliding body 120 while being adjacent to the display device 122, and a second keypad 112 positioned on an upper surface 110a of the stationary body 110 so as to be exposed/hidden when the sliding body 120 slides. The display device 122 may be an LCD. Alternatively, the display device 122 may be a touch screen so that information can be inputted/outputted by touching operations. In addition, the first keypad 124 or second keypad 112 may be replaced with a touch screen so that data can be inputted by pressing operations and various pieces of information can be inputted/outputted by touching operations.

The second user interfacing unit includes a speaker device 210 positioned on an upper surface 200a of the second body 200 and a camera lens 212 positioned on a lateral surface 200b of the second body 200 while being adjacent to the speaker device 210 so that the camera lens 212 can face in the forward, backward, or lateral direction in terms of the user. Particularly, the camera lens 212 can be directed towards the upper, bottom, or lateral surface of the sliding body 120. It is advantageous to separately fabricate the camera lens 212 and couple it to the sliding body 120 by a hinge module (not shown), considering slimness of the first body 100, particularly the sliding body 120. When a high-capacity camera module is used to contain the camera lens 212, which is positioned on the second body 200, an increase in thickness is inevitable, particularly in the case of a camera lens 212 having a zoom function. If such a camera module is integrally formed on the sliding body 120, the thickness of the sliding body 120 increases substantially. This is contrary to the trend towards slimness. In order to solve this problem, according to the present invention, a high-capacity camera lens module is rotatably positioned on the second body 200 in conformity with slimness of the portable terminal, including the sliding body 120.

Referring to FIG. 2, a protrusion 126 is positioned between the display device 122 and the first keypad 124 so that the sliding body 120 can be opened/closed easily.

FIG. 2 shows the portable terminal according to the present invention when used in a phone mode, and FIG. 4 shows the terminal in a DMB mode, video communication mode, or self-shot mode. In the DMB mode, the display device is cradled at a slant so that the user can watch it in a comfortable position.

As mentioned above, the portable terminal according to the present invention is advantageous in that it incorporates a self-cradling function so that it can be cradled easily and has economic merit from the viewpoint of a user or manufacturer. In a DBM mode or camera mode, the display device is cradled at a slant so that the user can watch the screen in an comfortable position. The sliding body can be slid to be opened/closed easily. A high-capacity camera module is rotatably connected to the first body in conformity with slimness of the first body. The portable terminal combines the function of a cradle with that of a camera for increased mounting efficiency and convenient use.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A self-cradling type portable terminal comprising:
   a first body having at least one first user interfacing unit, the first body having a stationary body and a sliding body adapted to slide in a longitudinal direction of the stationary body while continuously facing the stationary body so that a predetermined region of an upper surface of the stationary body is exposed/hidden, and
   a second body having at least one second user interfacing unit, the second body being connected to the first body so as to rotate about a hinge axis extending through a region of a lateral surface of the first body in a longitudinal direction of the first body, the region being spaced from a center of the lateral surface, so that the first body is supported at a slant by the second body when the second body is rotated by a predetermined angle relative to the first body;
   wherein the second user interfacing unit comprises a camera lens positioned on a lateral surface of the second body, and wherein the camera lens is adapted to face a user when the second body rotates about the hinge axis by the predetermined angle and supports the first body at a slant.

2. The self-cradling type portable terminal as claimed in claim 1, wherein the first user interfacing unit comprises:
   a display device positioned on an upper surface of the sliding body;
   a first keypad having a number of keys positioned on the upper surface of the sliding body while being adjacent to the display device; and
   a second keypad having a number of keys positioned on the upper surface of the stationary body so as to be exposed/hidden by sliding of the sliding body.

3. The self-cradling type portable terminal as claimed in claim 2 wherein the display device is positioned directly adjacent to a speaker device.

4. The self-cradling type portable terminal as claimed in claim 2, wherein a protrusion is positioned between the display device and the first keypad on the upper surface of the sliding body so that the sliding body can easily slide.

5. The self-cradling type portable terminal as claimed in claim 1, wherein the second user interfacing unit further comprises:
   a speaker device positioned on an upper surface of the second body.

6. The self-cradling type portable terminal as claimed in claim 5, wherein a display device is positioned directly adjacent to the speaker device.

7. The self-cradling type portable terminal as claimed in claim 5, wherein the camera lens is adapted to rotate towards a top, lateral, or bottom surface of the sliding body.

8. The self-cradling type portable terminal as claimed in claim 1, wherein the second body is adapted to rotate towards or away from the sliding body while continuously facing a lateral surface of the sliding body.

9. The self-cradling type portable terminal as claimed in claim 1, wherein the second body extends in a direction perpendicular to a longitudinal direction of the sliding body so as to be rotatably coupled to the sliding body.

10. The self-cradling type portable terminal as claimed in claim 1, wherein the second body has a free end adapted to abut a ground and support the first body at a slant.

11. The self-cradling type portable terminal as claimed in claim 1, wherein the hinge axis is parallel to a direction of sliding of the sliding body.

12. The self-cradling type portable terminal as claimed in claim 1, wherein the sliding body has a stepped bottom surface adapted to move towards or away from the stationary body.

13. A self-cradling type portable terminal comprising:
   a first body having at least one first user interfacing unit; and
   a second body having at least one second user interfacing unit, the second body being connected to the first body so as to rotate about a hinge axis extending through a region of a lateral surface of the first body in a longitudinal direction of the first body, the region being spaced from a center of the lateral surface, so that the first body is supported at a slant by the second body when the second body is rotated by a predetermined angle relative to the first body;
   wherein the second user interfacing unit comprises a camera lens positioned on a lateral surface of the second body, and wherein the camera lens is adapted to face a user when the second body rotates about the hinge axis by the predetermined angle and supports the first body at a slant.

14. The self-cradling type portable terminal as claimed in claim 13, wherein the first user interfacing unit comprises:
   a display device positioned on an upper surface of the first body; and
   a keypad having a number of keys positioned adjacent to the display device.

15. The self-cradling type portable terminal as claimed in claim 14, wherein the second body extends in a direction perpendicular to the longitudinal direction of the first body so as to be rotatably coupled to the first body.

16. The self-cradling type portable terminal as claimed in claim 13, wherein the second user interfacing unit further comprises:
   a speaker device positioned on an upper surface of the second body.

* * * * *